United States Patent
Kawamura

(10) Patent No.: US 7,034,894 B1
(45) Date of Patent: Apr. 25, 2006

(54) DIGITAL-TO-ANALOG CONVERSION MULTIPLE-FORMAT VIDEO ENCODER

(75) Inventor: Yasunori Kawamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/247,549

(22) Filed: Feb. 10, 1999

(30) Foreign Application Priority Data

Feb. 12, 1998 (JP) .............................. H 10-029419

(51) Int. Cl.
  H04N 3/27     (2006.01)
  H04N 5/46     (2006.01)
  H04N 9/64     (2006.01)
  H04N 9/65     (2006.01)
  H04N 9/67     (2006.01)

(52) U.S. Cl. ...................... 348/642; 348/555; 348/557; 348/659; 348/660; 348/661

(58) Field of Classification Search ................ 348/469, 348/554, 555, 557, 642, 659, 660, 661, 649; H04N 3/27, H04N 5/46, 9/64, 9/65, 9/67
See application file for complete search history.

(56) References Cited

U.S. PATENT DOCUMENTS

| | | | | |
|---|---|---|---|---|
| 4,679,072 A | * | 7/1987 | Takayama | 358/520 |
| 4,686,520 A | * | 8/1987 | Yamaoka | 348/659 |
| 4,788,586 A | * | 11/1988 | Eckenbrecht | 348/649 |
| 4,982,179 A | * | 1/1991 | Ogawa et al. | 348/557 |
| 5,119,176 A | * | 6/1992 | Stec et al. | 348/493 |
| 5,287,171 A | * | 2/1994 | Ohtsubo et al. | 348/642 |
| 5,365,275 A | * | 11/1994 | Kobayashi | 348/493 |
| 5,379,077 A | * | 1/1995 | Jack et al. | 348/708 |
| 5,389,974 A | * | 2/1995 | Bae | 348/555 |
| 5,406,335 A | * | 4/1995 | Nikoh | 348/642 |
| 5,579,056 A | * | 11/1996 | Chang | 348/557 |
| 5,638,135 A | * | 6/1997 | Mukai | 348/642 |
| 5,710,593 A | * | 1/1998 | Reynolds | 348/181 |
| 5,844,629 A | * | 12/1998 | Murray et al. | 348/642 |
| 6,052,156 A | * | 4/2000 | Mukai et al. | 348/642 |
| 6,124,899 A | * | 9/2000 | Swan et al. | 348/642 |
| 6,229,579 B1 | * | 5/2001 | Kondo et al. | 348/642 |

* cited by examiner

*Primary Examiner*—Brian Yenke
(74) *Attorney, Agent, or Firm*—Arent Fox PLLC

(57) ABSTRACT

A multiple-format video encoder stores values of the sine and cosine functions in a ROM. According to the externally specified video format, an address calculating circuit calculates the addresses at which to access the ROM. In the multiple-format video encoder, a luminance/color-difference signal generating circuit generates color-difference signals B-Y and R-Y from digital RGB signals. A first multiplying circuit multiplies the color-difference signal B-Y by the values of the sine function stored in the ROM at the addresses specified by the address calculating circuit and multiplies the color-difference signal R-Y by the values of the cosine function stored at the same addresses.

13 Claims, 3 Drawing Sheets

DIGITAL-TO-ANALOG CONVERSION MULTIPLE-FORMAT VIDEO ENCODER

BACKGROUND OF THE INVENTION

1. Field of the Invention

The present invention relates to a multiple-format video encoder that can encode RGB signals in various video formats such as the NTSC (National Television System Committee) format and the PAL (phase-alternation line) format.

2. Description of the Prior Art

A device called a multiple-format video encoder is used to generate a color-difference signal from RGB signals and then generate a carrier chrominance signal and other signals by modulating a chrominance subcarrier with the color-difference signal in a video format that conforms to the NTSC, PAL, or other system. For example, an encoder designed for the NTSC system generates from RGB signals fed thereto a luminance signal Y and a carrier chrominance signal C in accordance with the formulae (1) and (2) below.

$$Y = 0.299\,R + 0.587\,G + 0.114\,B \qquad (1)$$

$$C = [(B-Y)/2.08] \cdot \sin \omega t + [(R-Y)/1.14] \cdot \cos \omega t \qquad (2)$$

where $\omega$ equals to $2\pi f_{sc}$, where $f_{sc}$ represents the frequency of the chrominance subcarrier, which, for the NTSC system, equals to 3.579545 MHz.

In a digital encoder that generates from digital RGB signals fed thereto a digital luminance signal Y and a digital carrier chrominance signal C, for example in a case where the digital encoder receives the digital RGB signals at 13.5 MHz, the values of $\sin \omega t$ and $\cos \omega t$ at various phases at 13.5 MHz are stored in a ROM (read-only memory), so that, when the carrier chrominance signal C is generated in accordance with the above-noted formulae, the values of $\sin \omega t$ and $\cos \omega t$ are read out sequentially from the ROM in synchronism with 13.5 MHz clock pulses.

Specifically, as shown in FIG. 1, the interval between two adjacent pulses in the 13.5 MHz clock pulses of the encoder corresponds to a phase difference Ph of 360×3.579545/13.5=95.45 (degrees) in the chrominance subcarrier. Accordingly, the values of $\sin \omega t$ at phases S0, S1, . . . are stored in the above-mentioned ROM. Similarly, the values of $\cos \omega t$, whose curve is different only in phase from the curve of $\sin \omega t$ shown in FIG. 1, are determined and stored in the above-mentioned ROM. The stored values are read out sequentially, i.e. in order of S0, S1, . . . , in synchronism with the clock pulses to generate the chrominance subcarrier.

The ratio $f_{sc}/13.5$ MHz of the frequency of the chrominance subcarrier to the frequency 13.5 MHz of the clock pulses equals to 35/132. Accordingly, in the above-mentioned ROM, a total of 132 values of the sine function, i.e. corresponding to phases S0, S1, . . . , S131, are stored, and the values are read out sequentially and recurrently, i.e. from S0 to S131, and then again from S0 to S131, and so forth. Thus, in the above-mentioned ROM are stored the values that correspond to 35 cycles of the chrominance subcarrier.

The above-described relationship as actually observed in the NTSC system is shown in the column headed "NTSC" in Table 1 below. In Table 1, the "number of words" represents the number of values, for each of the sine and cosine functions, that are stored in the above-mentioned ROM; that is, one value of the sine function or one value of the cosine function is stored per one word.

TABLE 1

|  | NTSC | PAL | PAL-M | PAL-N |
|---|---|---|---|---|
| $f_{sc}$ (MHz) | 3.579545 | 4.43361875 | 3.57561149 | 3.58205625 |
| $f_{sc}/13.5$ MHz | ≈35/132 | ≈423/1288 | ≈303/1144 | ≈173/652 |
| Phase Difference (°) per Clock Pulse Interval | 95.45 | 118.23 | 95.35 | 95.52 |
| Number of Words | 132 | 1288 | 1144 | 652 |

Different video formats are used in different regions of the world, such as the NTSC, PAL, PAL-M, PAL-N, and other systems. Different video systems use different frequencies for the chrominance subcarrier from which the carrier chrominance signal is generated. For this reason, in a conventional multiple-format video encoder that is composed of digital circuits and that is designed to cope with a plurality of video formats, it is inevitable to store different sets of values of the sine and cosine functions separately for different video formats.

For example, in the PAL system, as shown in the column headed "PAL" in Table 1, the frequency $f_{sc}$ of the chrominance subcarrier is 4.43361875 MHz, and therefore, in a cases where the encoder receives RGB signals at 13.5 MHz, the frequency ratio $f_{sc}/13.5$ MHz approximately equals 423/1288. Accordingly, one clock pulse interval corresponds to a phase difference of 360×423/1288=118.23 (degrees), and therefore the ROM needs to be capable of storing a total of 1288 words for each of the sine and cosine functions.

In the PAL-M system, the frequency $f_{sc}$ of the chrominance subcarrier is 3.57561149 MHz, and therefore, in a cases where the encoder receives RGB signals at 13.5 MHz, the frequency ratio $f_{sc}/13.5$ MHz approximately equals 303/1144. Accordingly, one clock pulse interval corresponds to a phase difference of 95.35 (degrees), and therefore the ROM needs to be capable of storing a total of 1144 words.

In the PAL-N system, the frequency $f_{sc}$ of the chrominance subcarrier is 3.58205625 MHz, and therefore, in a cases where the encoder receives RGB signals at 13.5 MHz, the frequency ratio $f_{sc}/13.5$ MHz approximately equals 173/652. Accordingly, one clock pulse interval corresponds to a phase difference of 95.52 (degrees), and therefore the ROM needs to be capable of storing a total of 652 words.

Thus, in a conventional multiple-format video encoder, to cope with the NTSC, PAL, PAL-M, and PAL-N formats, which use different frequencies $f_{sc}$ for the chrominance subcarrier, it is necessary to provide separate ROMs for different formats, and store in those ROMs a total of 132+1288+1144+652=3216 words for each of the sine and cosine functions. Consequently, a conventional multiple-format video encoder suffers from comparatively high costs resulting from the large capacity required in the ROMs.

It is also customary to group the addresses available on a single ROM into a plurality of areas so that values of trigonometric functions for different video formats used for encoding are stored in different areas on a single ROM. Even in this case, the areas for different video formats are not in any way related with each other, and therefore this method should be regarded as equivalent to providing separate ROMs.

SUMMARY OF THE INVENTION

An object of the present invention is to provide a multiple-format video encoder that requires less memory than ever.

Another object of the present invention is to provide a multiple-format video encoder that can cope with new video formats with ease.

To achieve the above object, according to the present invention, a multiple-format video encoder for encoding digital RGB signals in a plurality of video formats is provided with: a color-difference signal generating circuit for generating a color-difference signal from the RGB signals; a memory for storing values of trigonometric functions covering a predetermined number of cycles at addresses corresponding to evenly spaced phases; an address calculating circuit for calculating the addresses at which to access the memory in accordance with the video format actually used; and a multiplying circuit for multiplying the color-difference signal by values calculated from the values of the trigonometric functions stored at the addresses specified by the address calculating circuit.

In this configuration, the multiple-format video encoder stores in the memory 1024 words of values for each of the sine and cosine functions. In accordance with the video format, the address calculating circuit specifies evenly spaced addresses, and, at the addresses specified by the address calculating circuit, the values of the sine and cosine functions are read out from the memory. The multiple-format video encoder then multiplies, by the use of the multiplying circuit, the color-difference signal output from the color-difference generating circuit by the value of the trigonometric values obtained from the memory. Thus, the multiple-format video encoder can perform encoding in a plurality of video formats that use different frequencies for the chrominance subcarrier. In this configuration, the values of the trigonometric functions stored in the memory for a plurality of video formats are shared between those video formats, and therefore it is not necessary to increase the capacity of the memory in accordance with the number and types of video formats combined.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
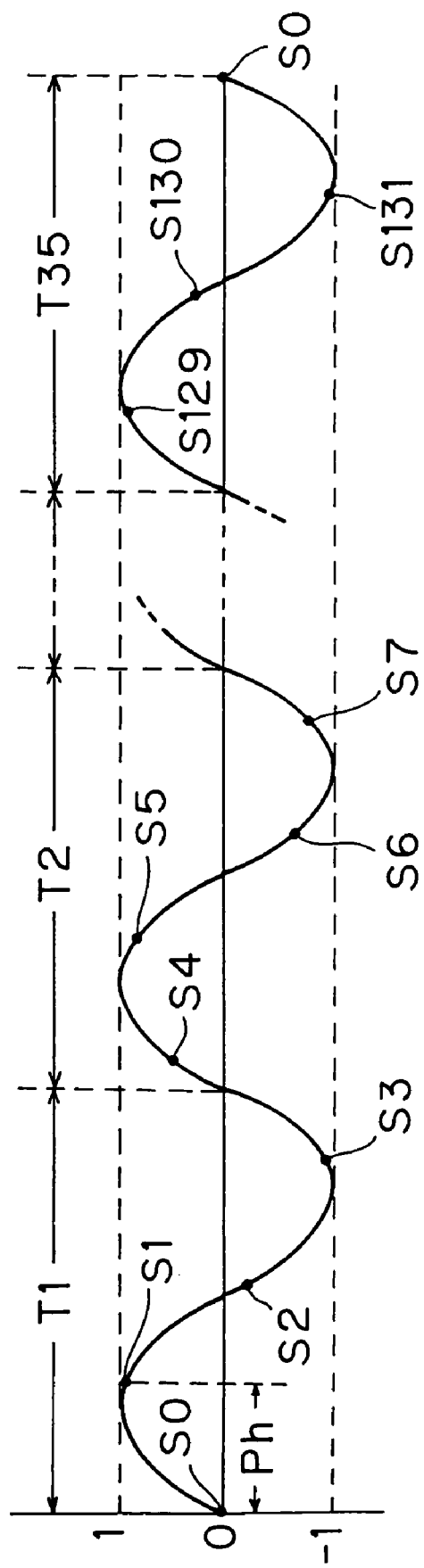
FIG. 1 is a diagram showing an example of the data stored in the ROM in a conventional multiple-format video encoder.
Figure 2:
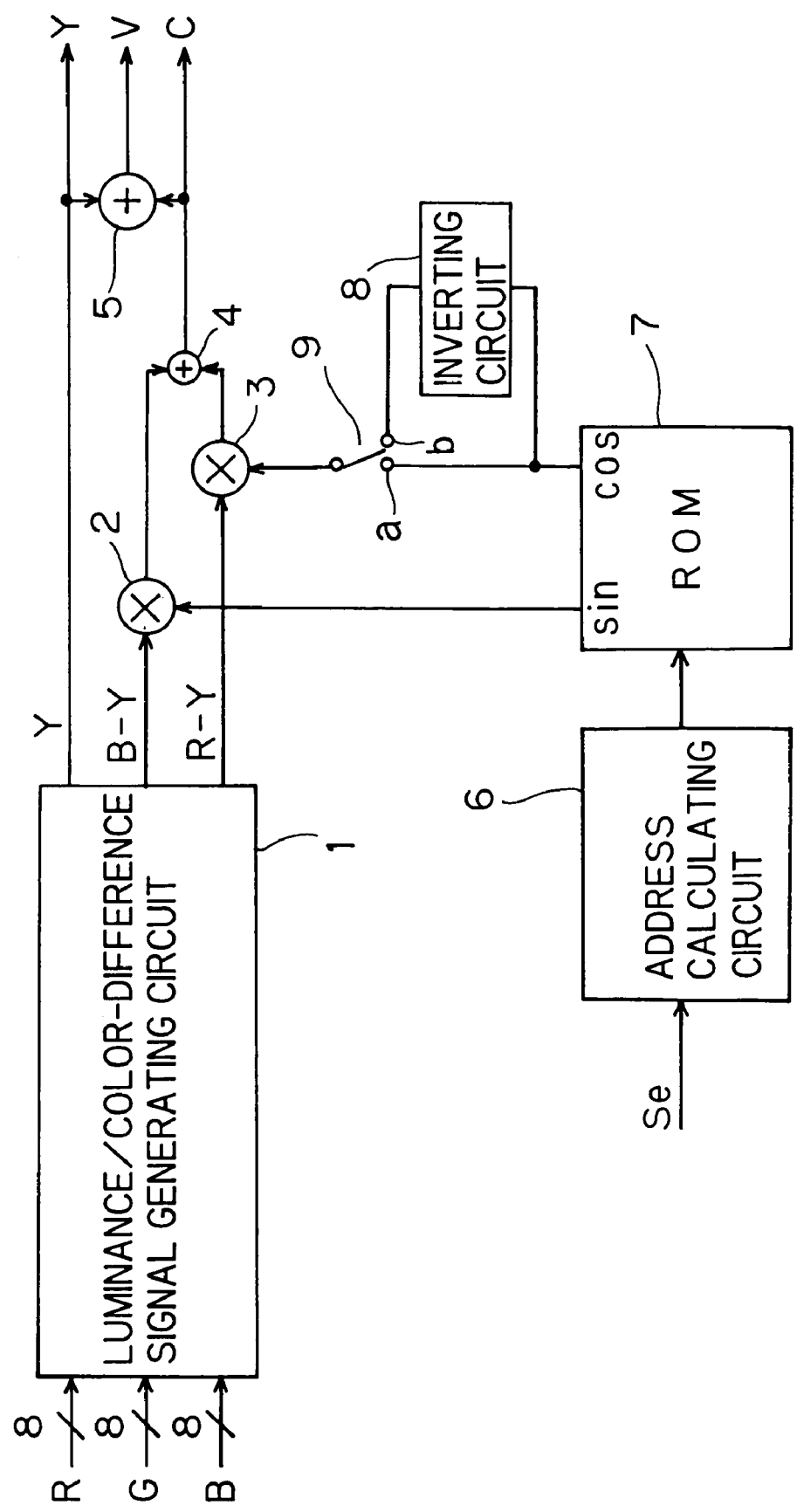
FIG. 2 is a block diagram of a multiple-format video encoder embodying the invention.

Hereinafter, an embodiment of the present invention will be described with reference to the accompanying drawings. FIG. 2 is a block diagram of a multiple-format video encoder embodying the invention. The multiple-format video encoder is fed with digital RGB signals composed of R, G, and B signals each consisting of 8 bits, and also with a signal Se for selecting a video format such as the NTSC and PAL formats. In this embodiment, the RGB signals are assumed to be fed in at 13.5 MHz. Therefore, the multiple-format video encoder operates in synchronism with 13.5 MHz clock pulses.

The RGB signals are fed to a luminance/color-difference signal generating circuit 1, which generates therefrom a luminance signal Y and color-difference signals B-Y and R-Y. The luminance signal Y is generated in accordance with the formula (1) noted earlier. The color-difference signals B-Y and R-Y are generated so that their amplitude is limited to 1/2.08 and 1/1.14, respectively, in conformity with the previously noted formula (2).

On the other hand, the signal Se is fed to an address calculating circuit 6, which, in accordance with the video format specified by the signal Se, performs calculations necessary to select evenly spaced addresses with which to access a ROM 7. The ROM 7 outputs values of trigonometric functions that correspond to (i.e. are stored at) the addresses specified by the address calculating circuit 8. At this time, the values of the trigonometric functions, i.e. the sine and cosine functions, of the chrominance subcarrier are read out from the ROM 7.

A multiplying circuit 2 multiplies the color-difference signal B-Y output from the luminance/color-difference signal generating circuit 1 by the values of the sine function read out from the ROM 7. A multiplying circuit 3 multiplies the color-difference signal R-Y output from the luminance/color-difference signal generating circuit 1 by values calculated from the values of the cosine function read out from the ROM 7.

However, when the video format used is the NTSC system, a switch 9 is kept in the a position, and thus the values of the cosine function output from the ROM 7 are fed directly to the multiplying circuit 3. By contrast, when the video format used is the PAL system, the switch 9 is continuously toggled between the a position, for one scanning line, and the b position, for the next scanning line, and so forth. In this case, when the switch 9 is in the b position, the values of the cosine function are fed not directly but through an inverting circuit 8. As a result, for the color-difference signal R-Y, the polarity of the chrominance subcarrier is inverted every scanning line.

An adding circuit 4 adds together the results of the multiplication by the multiplying circuits 2 and 3 and thereby generates a carrier chrominance signal C. An adding circuit 5 adds together the luminance signal Y and the carrier chrominance signal C and thereby generates a composite color video signal V. In this way, the multiple-format video encoder of this embodiment encodes the RGB signals fed thereto in a video format specified by the signal Se so as to output a luminance signal Y, a carrier chrominance signal C, and a composite color video signal V.

In the ROM 7 are stored, as listed in Table 2 below, 1024 words of values for each of the sine and cosine functions. For the sine function, as indicated by the curve B in FIG. 3, along the wave of one cycle of the sine function, 1024 evenly spaced points are taken, with the starting point given the address 0 where a value 0 is stored as the corresponding value of the sine function, and, for each of the subsequent points, the value of the sine function is stored at the corresponding address in the ROM.

TABLE 2

| Address | sin | cos |
|---------|-----|-----|
| 0       | 0   | 1   |
| .       | .   | .   |
| .       | .   | .   |
| .       | .   | .   |
| 256     | 1   | 0   |
| .       | .   | .   |
| .       | .   | .   |
| .       | .   | .   |
| 512     | 0   | −1  |
| .       | .   | .   |
| .       | .   | .   |
| .       | .   | .   |
| 768     | −1  | 0   |
| .       | .   | .   |
| .       | .   | .   |
| .       | .   | .   |
| 1023    | ≈0  | ≈1  |

Figure 3:
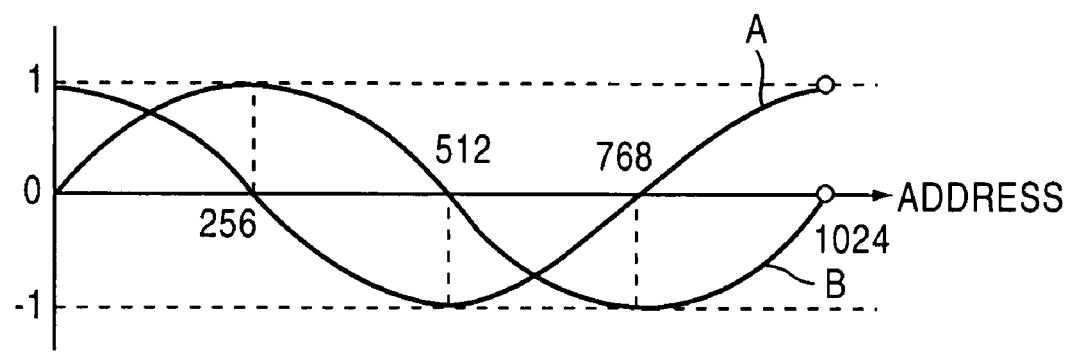
FIG. 3 is a graphical representation of the values of the trigonometric functions stored in the ROM of the multiple-format video encoder of the embodiment.

As seen from Table 2 and FIG. 3, the value of the sine function equals 1 at the address 256, equals 0 at the address 512, equals −1 at the address 768, and is very close to 0 at the last address 1023.

On the other hand, the wave of the cosine function indicated by the curve A in FIG. 3 has a phase difference of go degrees relative to the curve B, and thus the value of the cosine function at the address 0 is 1. The value of the cosine function equals 0 at the address 256, equals −1 at the address 512, equals 0 at the address 768, and is very close to 1 at the last address 1023. Note that, in FIG. 3, the values of the sine and cosine functions at the address 1024 are equal to their respective values at the address 0.

The address calculating circuit 6 calculates addresses in the following manner. When the video format used is the NTSC format, the frequency $f_{sc}$ of the chrominance subcarrier is 3.579545 MHz, which, if converted into the wave shown in FIG. 3, corresponds to a frequency of 1024× 3.579545. Therefore, in a case as described above where the multiple-format video encoder operates at 13.5 MHz, 1024× 3.579545/13.5=271.52. This value can be rounded off to 272, and by adding 272, as the value to be added, to the address at every clock pulse, it is possible to obtain from the ROM 7 values approximate to the values of the sine and cosine functions as will be obtained when one clock pulse interval corresponds to a phase difference of 95.45 degrees in the chrominance subcarrier. In this way, the address calculating circuit 6 secures even spaces between the addresses by adding a predetermined value thereto.

This addition is repeated and, when the address reaches 1024, thereafter the addresses are calculated on the assumption that the address 1024 is equivalent to the address 0, and the values of the sine and cosine functions are read out from the ROM 7 accordingly. Since the PAL, PAL-M, and PAL-N systems use different frequencies $f_{sc}$ for the chrominance subcarrier, simply by varying the above-mentioned value to be added, it is possible to realize a multiple-format video encoder that can perform encoding in a plurality of video formats.

However, in the above-described example, the value to be added to the addresses is a 10-bit value, as are the addresses with which to access the ROM 7. Thus, the error resulting from the rounding-off of the value will be accumulated as the addition is repeated. As a result, it is inevitable that the frequency $EF_{sc}$ of the chrominance subcarrier that is actually processed by the encoder deviates slightly from the frequency $f_{sc}$ of the chrominance subcarrier.

To minimize such deviation, in the embodiment under discussion, addresses are calculated using a larger number of bits (for example, 20 bits here) within the address calculating circuit 6, and then the addresses are converted into 10-bit addresses before being fed to the ROM 7.

Figure 4:
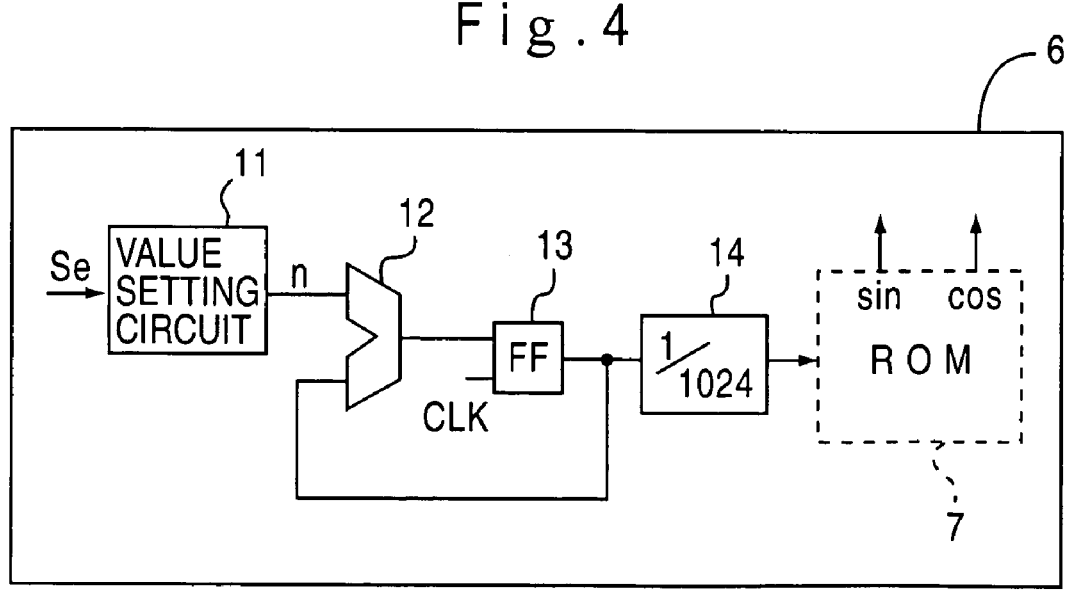
FIG. 4 is a block diagram showing the internal configuration the address calculating circuit of the multiple-format video encoder of the embodiment.

FIG. 4 is a block diagram showing the internal configuration of the address calculating circuit 6. In accordance with the signal Se that is fed from the outside to the multiple-format video encoder to specify a video format such as the NTSC and PAL formats, a value setting circuit 11 outputs a 20-bit value n to be added; for example, when the NTSC format is specified, it outputs, as the value to be added, $3.579545 \times 2^{20}/13.5 = 278032$.

A 20-bit adder 12 adds the value n to be added to a 20-bit address. A flip-flop circuit (FF) 13 is fed with the result of the addition by the adder 12, and outputs it in synchronism with 13.5 MHz clock pulses CLK. The output of the flip-flop 13 is fed to one input terminal of the adder 12. Since the output of the flip-flop 13 is a 20-bit address, it is first subjected to a shift operation by a shift circuit 14 and thereby divided by 1024 so as to be converted into a 10-bit address, before being fed to the ROM 7.

The adder 12 continues to add the value n to the previously obtained address, outputting it in such a way that the address returns to 0 when it reaches $2^{20} = 1048576$. Accordingly, when the result of the addition is 1048577, the adder 12 outputs 1. For the 20-bit adder 12 to achieve this operation, it has only to perform 20-bit addition, neglecting overflow.

The above-described relationship as actually observed in the NTSC system is shown in the column headed "NTSC" in Table 3 below. In the NTSC system, the frequency $f^{sc}$ of the chrominance subcarrier is 3.579545 MHz, and accordingly, when the multiple-format video encoder operates in synchronism with 13.5 MHz clock pulses, one clock pulse interval corresponds to a phase difference of 360·3.579545/ 13.5=95.4545 degrees in the chrominance subcarrier. If addresses are calculated on a 10-bit basis as they are handled by the ROM 7, the value to be added at every clock pulse will be 272 as already described; however, where addresses are calculated on a 20-bit basis as in this embodiment, the value to be added will be 278032.

TABLE 3

|  | NTSC | PAL | PAL-M | PAL-N |
|---|---|---|---|---|
| $f_{sc}$ (MHz) | 3.579545 | 4.43361875 | 3.57561149 | 3.58205625 |
| Phase Difference (°) per Clock Pulse Interval | 95.4545 | 118.2298 | 95.3496 | 95.5215 |
| Value to be Added on a 10-bit Basis | 272 | 336 | 271 | 272 |

TABLE 3-continued

|  | NTSC | PAL | PAL-M | PAL-N |
|---|---|---|---|---|
| Value to be Added on a 20-bit basis | 278032 | 344369 | 277726 | 278227 |

In the PAL system, the frequency $f_{sc}$ of the chrominance subcarrier is 4.43361875 MHz, and accordingly one clock pulse interval corresponds to a phase difference of 118.2298 degrees in the chrominance subcarrier. In this case, the value to be added on a 10-bit basis is 1024×4.43361875/13.5=336.30, which is rounded off to 336; the value to be added on a 20-bit basis is 1048576×4.43361875/13.5=344369.35, which is rounded off to 344369.

In the PAL-M system, the frequency $f_{sc}$ of the chrominance subcarrier is 3.57561149 MHz, and accordingly one clock pulse interval corresponds to a phase difference of 95.3496 degrees in the chrominance subcarrier. In this case, by the same calculation method as is used above, the value to be added is determined as 271 on a 10-bit basis, and 277726 on a 20-bit basis.

In the PAL-N system, the frequency $f_{sc}$ of the chrominance subcarrier is 3.58205625 MHz, and accordingly one clock pulse interval corresponds to a phase difference of 95.5215 degrees in the chrominance subcarrier. In this case, by the same calculation method as is used above, the value to be added is determined as 272 on a 10-bit basis, and 278227 on a 20-bit basis.

As described above, in this embodiment, addresses are calculated using a larger number of bits (for example, 20 bits here) within the address calculating circuit 6. This helps achieve higher encoding accuracy than in cases where addresses are calculated on a 10-bit basis.

In actual designing, the number of bits used is determined for each video format in the following manner. First, the value to be added to the addresses is calculated using an increasing number of bits, starting with 10 bits. Then, for each value, the frequency $EF_{sc}$ of the actual chrominance subcarrier obtained with that value is calculated, and the deviation of $EF_{sc}$ from $f_{sc}$ is evaluated as delta=$(EF_{sc}-f_{sc})/f_{sc}$. Then, the value that gives the desired accuracy is selected.

Calculating addresses on a 20-bit basis as in this embodiment helps keep the deviation delta within approximately 1 ppm irrespective of the video format used, and thereby achieve sufficiently high calculation accuracy. It is of course possible to enhance the calculation accuracy by further increasing the number of bits to, for example, 25 or 30 bits.

As described above, in this embodiment, 1024 words of values of each of the sine and cosine functions are stored in the ROM 7, and those values can be shared among various video formats such as the NTSC and PAL formats. Accordingly, as compared with the conventional multiple-format video encoder described earlier, it is possible to reduce the storage capacity occupied by the values of either the sine or cosine function dramatically from 3216 words to 1024 words. As a result, although an address calculating circuit 6 is additionally provided in this embodiment, the smaller capacity required in the ROM 7 makes it possible to reduce the size, and thus the manufacturing costs, of the multiple-format video encoder as a whole.

Moreover, the address calculating circuit 6 calculates addresses on a 20-bit basis, and divides the obtained addresses by 1024 to convert them into 10-bit addresses that are actually fed to the ROM 7. This helps minimize the deviation of the frequency of the chrominance subcarrier that arises during address calculation, and thereby allow the multiple-format video encoder to perform encoding with high accuracy.

Furthermore, the number and types of the video formats that the multiple-format video encoder can cope with can be changed easily, in principle simply by adding or changing the value n to be added (see FIG. 4). In particular, a comparatively large number of types of video formats can be coped with without increasing the storage capacity of the ROM 7. Even in cases where the RGB signals are fed in at a frequency other than 13.5 MHz, it is possible to use the same calculation method as described above to determine the value to be added that will allow the multiple-format video encoder to perform encoding in synchronism with those RGB signals.

The multiple-format video encoder described above is incorporated, for example, in a game apparatus. In a game apparatus, the multiple-format video encoder receives RGB signals fed from a computer, or receives RGB signals fed from a video IC under the control of a computer, and outputs a video signal in a video format conforming to the television monitor used. Other applications of the above-described multiple-format video encoder include digital video disk players, digital video cameras, video printers, and CS/BS (communications satellite and broadcasting satellite) tuners.

The invention claimed is:

1. A multiple-format video encoder comprising:
   a luminance/color-difference signal generating circuit that receives digital RGB signals to be inputted in synchronism with clock pulses at a predetermined frequency and generates a luminance signal and a color-difference signal from the RGB signals;
   a memory that stores trigonometric function values covering a predetermined number of phases at each address thereof for each of the phases and outputs a trigonometric function value stored at a designated address; and
   an address calculating circuit that receives a setting signal for selecting a predetermined video format from among a plurality of video formats each having a different chrominance subcarrier frequency, the address calculating circuit calculates a value to be added based on the chrominance subcarrier frequency of the predetermined video format selected with the setting signal, the predetermined number of phases, and the predetermined frequency of the clock pulses, and the address calculating circuit designates a next address of the memory by adding the calculated value to be added to the designated address,
   wherein a composite color video signal of the predetermined video format selected with the setting signal is generated based on the color-difference signal, the luminance signal, and a trigonometric function value stored in an address designated by the address calculating circuit.

2. A multiple-format video encoder as claimed in claim 1, wherein the address calculating circuit comprises:
a value selecting circuit for calculating the value to be added;
an adder for adding the value to be added calculated by the value selecting circuit to the address designated by the address calculating circuit and outputting a value thus obtained; and
a flip-flop circuit for temporarily storing the value output from the adder and refreshing this value in synchronism with regular clock pulses so as to output the value therefrom.

3. A multiple-format video encoder as claimed in claim 2, wherein the value selecting circuit, the adder, and the flip-flop circuit perform operations thereof by using a larger number of bits than a minimum number of bits required to express the predetermined number of phases, and
the address calculating circuit further comprises a shift circuit for dividing, through a shift operation, a value output from the flip-flop circuit to convert the value outputted from the flip-flop circuit back into a value consisting of the minimum number of bits required to express the predetermined number of phases so as to produce the next address.

4. A multiple-format video encoder as claimed in claim 3, wherein the value selecting circuit, the adder, and the flip-flop circuit perform operations thereof by using 20 bits, and
the shift circuit divides the value output from the flip-flop circuit by 1024 to convert the value output from the flip-flop circuit back into a value consisting of 10 bits so as to produce the next address.

5. A multiple-format video encoder as claimed in claim 1, wherein the color-difference signal includes color-difference signals B-Y and R-Y,
wherein the trigonometric function values include values of sine and cosine functions, and
wherein the multiple-format video encoder further comprises:
a first multiplying circuit for multiplying the color-difference signal B-Y by the values of the sine function;
a second multiplying circuit for multiplying the color-difference signal R-Y by values calculated from the values of the cosine function; and
an adding circuit for adding an output of the first multiplying circuit to an output of the second multiplying circuit to obtain a carrier chrominance signal.

6. A multiple-format video encoder as claimed in claim 5, further comprising:
an inverting circuit for inverting polarity of the values of the cosine function; and
a switch for feeding the second multiplying circuit alternately with the values of the cosine function intact, for one scanning line of the RGB signals, and with the values of the cosine function after inversion by the inverting circuit, for a next line of the RGB signals, and so forth.

7. A multiple-format video encoder as claimed in claim 6, wherein the plurality of video formats used includes an NTSC format and a PAL format, and
wherein, when the NTSC format is used, the switch keeps feeding the second multiplying circuit with the values of the cosine function intact, and, when the PAL format is used, the switch feeds the second multiplying circuit alternately with the values of the cosine function intact, for one scanning line of the RGB signals, and with the values of the cosine function after inversion by the inverting circuit, for a next line of the RGB signals, and so forth.

8. A multiple-format video encoder as claimed in claim 5, wherein the plurality of video formats includes NTSC, PAL, PAL-M, and PAL-N formats, and
the value to be added has a different value depending on whether the NTSC, PAL, PAL-M, or PAL-N format is used.

9. A multiple-format video encoder as claimed in claim 1, wherein the value to be added is obtained by dividing a value resulting from multiplying the chrominance subcarrier frequency by the predetermined number of phases by the predetermined frequency of the clock pulses.

10. A multiple-format video encoder comprising:
a luminance/color-difference signal generating circuit that receives digital RGB signals to be inputted in synchronism with clock pulses at a predetermined frequency, generates a luminance signal and a color-difference signal from the RGB signals, and feeds out the luminance and the color-difference signals;
a memory that stores trigonometric function values covering a predetermined number of phases at each address thereof for each of the phases and outputs a trigonometric function value stored at a designated address; and
an address calculating circuit that receives a setting signal for selecting a predetermined video format from among a plurality of video formats, comprising:
a value selecting circuit that divides a value resulting from multiplying the chrominance subcarrier frequency of the predetermined video format by the predetermined number of phases by the predetermined frequency of the clock pulses and outputs a result as a value to be added;
an adder that adds the value to be added to the designated address and outputs a value to be used for deciding an address to be designated;
a flip-flop circuit that temporarily stores the value output from the adder and feeds out this value in synchronism with regular clock pulses as the address to be designated;
a multiplying circuit for multiplying the color-difference signal by a trigonometric function value read from the designated address and outputting a value therefrom, and
an adder for adding the value output from the multiplying circuit to the luminance signal to generate and output a composite color video signal.

11. A multiple-format video encoder as claimed in claim 10,
wherein the value selecting circuit, the adder, and the flip-flop circuit perform operations thereof by using a larger number of bits than a minimum number of bits required to express the predetermined number of phases, and
the address calculating circuit further comprises a shift circuit for dividing, through a shift operation, the value output from the flip-flop circuit to convert the value outputted from the flip-flop circuit back into a value consisting of the minimum number of bits required to express the predetermined number of phases so as to produce the address to be designated.

12. A multiple-format video encoder as claimed in claim 11,
wherein the value selecting circuit, the adder, and the flip-flop circuit perform operations thereof by using 20 bits, and the shift circuit divides the value output from the flip-flop circuit by 1024 to convert the value output from the flip-flop circuit back into a value consisting of 10 bits so as to produce the address to be designated.

13. A multiple-format video encoder as claimed in claim 10,
wherein the plurality of video formats includes NTSC, PAL, PAL-M, and PAL-N formats, and the value to be added has a different value depending on whether the NTSC, PAL, PAL-M, or PAL-N format is used.

* * * * *